July 18, 1961 M. KROFTA 2,992,651
STOCK CONSISTENCY INDICATOR
Filed July 2, 1957 2 Sheets-Sheet 1

INVENTOR.
MILOS KROFTA
BY Paul W. Garbo
AGENT

July 18, 1961     M. KROFTA     2,992,651
STOCK CONSISTENCY INDICATOR
Filed July 2, 1957     2 Sheets—Sheet 2
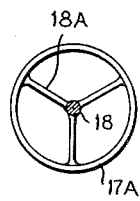
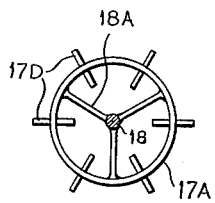
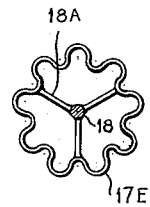
FIG. 1A     FIG. 1D     FIG. 1E
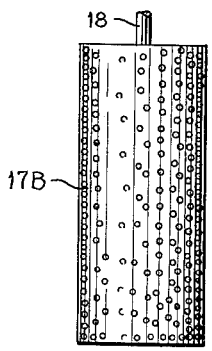
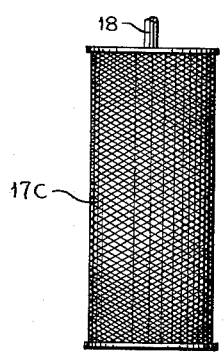
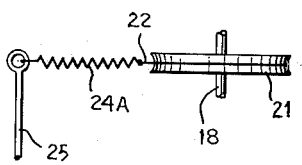
FIG. 6
FIG. 1B     FIG. 1C
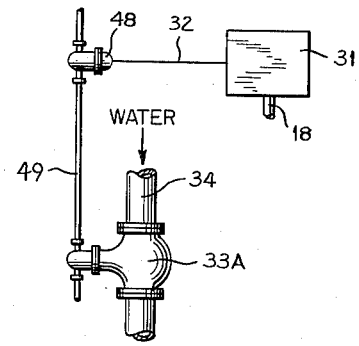
FIG. 7
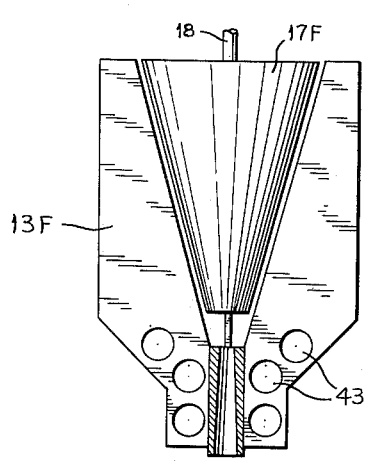
FIG. 8
INVENTOR.
MILOS KROFTA
BY Paul W. Garbo
AGENT

United States Patent Office 2,992,651
Patented July 18, 1961

---

2,992,651
STOCK CONSISTENCY INDICATOR
Milos Krofta, 58 Yokun Ave., Lenox, Mass.
Filed July 2, 1957, Ser. No. 669,634
13 Claims. (Cl. 137—92)

This invention relates to the measurement and regulation of the consistency of liquids containing suspended solids such as the aqueous suspensions of fibrous materials known in the pulp and paper industry as stocks.

While numerous devices have been proposed and some adopted for measuring and regulating the consistency of liquids containing suspended solids, none has proved to be entirely satisfactory particularly in regard to accuracy, reliability and cost. One common type of the prior devices involves a chamber through which the liquid flows while a bladed rotor is rotated therein at constant speed. The rotor is free to move along its axis of rotation and such movement is caused by the reaction of the liquid on the bladed rotor. The amount of movement or reaction of the rotor is correlated to the consistency of the liquid-solid suspension. This type of device has several disadvantages including limited accuracy and reliability.

A principal object of this invention is to measure and regulate the consistency of liquids containing suspended solids more accurately and more reliably than has been possible heretofore.

Another important object is to provide simple apparatus for such measurement and regulation of the consistency of paper stocks and other liquid-solid suspensions.

These and other objects and advantages of the invention will be apparent from the description which follows.

In accordance with the invention, accurate and reliable indication or measurement of the consistency of a liquid-solid suspension is simply attained by flowing the suspension through a tubular vessel in which are disposed a constant-speed stirrer and a reaction rotor. The stirrer and rotor are mounted on separate shafts which extend into the vessel, preferably from opposite ends thereof, and which are aligned with one another and substantially parallel to the direction of liquid flow through the vessel. The stirrer which is driven by a constant-speed motor is adapted essentially to impart a rotational component to the flow of liquid through the vessel and the rotational force of the liquid acts on the rotor which is mounted on a shaft that is free to rotate in its frictionless bearings. The higher the consistency of the liquid flowing through the vessel the higher is the torque on the reaction rotor. The shaft which supports the rotor is provided with means for imposing a gradually increasing counter-torque so that for each consistency of the liquid-solid suspension the rotor and its shaft will turn a finite amount, i.e., only a relatively few angular degrees. When properly calibrated, this angular displacement of the reaction rotor may be taken as a measure of the consistency of the liquid-solid suspension. Means may be associated with the rotor and its shaft for automatically controlling the flow of diluting liquid into the liquid-solid suspension to adjust or regulate its consistency to a predetermined value.

For a better understanding of the invention, reference will now be made to the accompanying drawings of which:

FIGURES 1A through 1E are views of still other alternative forms of the rotor;

FIGURE 6 is a fragmentary view showing another means for creating a gradually increasing counter torque;

FIGURE 7 is a fragmentary view showing another form of the means controlling the flow of water into the feed stock; and FIGURE 8 is an elevational view of still another alternative stirrer and reaction rotor.

Figure 1:
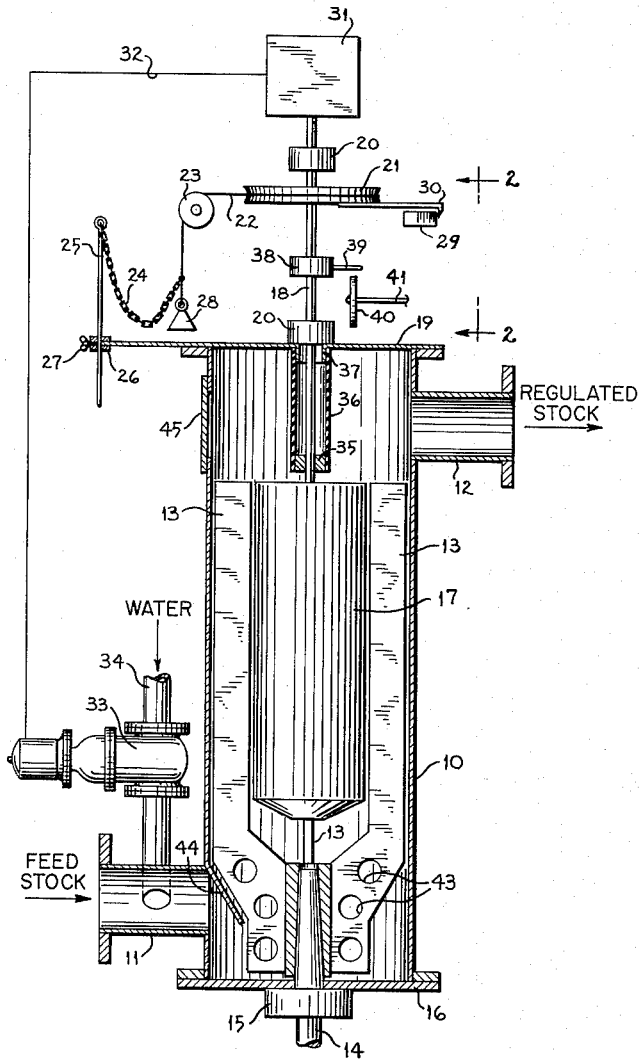
FIGURE 1 is a sectional elevation of a preferred form of the consistency regulator of this invention.
Figure 2:
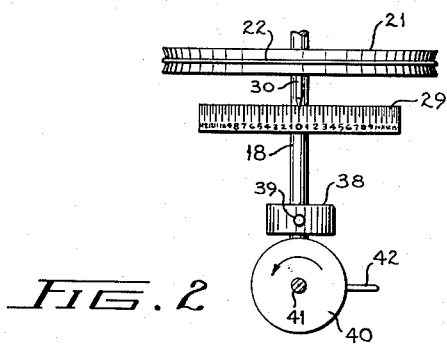
FIGURE 2 is an enlarged elevation of the consistency scale with its indicator arm and the means for periodically resetting the reaction rotor of the regulator of FIGURE 1.

The consistency regulator shown in FIGURE 1 comprises a cylindrical vessel 10 having a feed stock inlet 11 and a regulated stock outlet 12 adjacent the lower and upper ends, respectively, of vessel 10. A four-bladed stirrer 13 is disposed in vessel 10 for rotation therein by a shaft 14 which passes through a leakproof packing box 15 mounted on bottom plate 16 of vessel 10. Suspended in the space between the furcated blades of stirrer 13 is a reaction rotor 17 depending from a shaft 18 that passes through top plate 19 of vessel 10. Shaft 18 is freely rotatable in the two supporting ball-bearing or like frictionless bearings 20. On the basis of the structural elements thus far described it is evident that when a paper stock is flowing through vessel 10 and shaft 14 is rotated by a suitable motor, the resulting rotation of stirrer 13 imparts a rotational component to the flow of the stock with the result that a torque is applied on reaction rotor 17. With the rotation of stirrer 13 at constant speed, the magnitude of the torque transmitted to rotor 17 increases with the consistency of the stock.

In the absence of a counter torque, rotor 17 would rotate continuously in the same direction of stirrer 13. Pursuant to this invention, means are associated with shaft 18 for applying thereto a counter-balancing torque of gradually increasing magnitude as the consistency of the stock increases. The particular means shown in FIG. 1 comprise a pulley 21 mounted on shaft 18 and keyed thereto so that pulley 21 and shaft 18 rotate in unison. A flexible string of wire 22 with one end fastened to the periphery of pulley 21 is wrapped around pulley 21 and passes over pulley 23 so that its other end is fastened to a chain 24. The end of chain 24 opposite to that which wire 22 is tied is supported by an adjustable rod 25 which passes through a clamp 26 mounted on top plate 19. By loosening wing screw 27 of clamp 26, rod 25 may be moved upwardly or downwardly and then again tightened in order to decrease or increase, respectively, the range of counter-balancing torques applied on shaft 18. Another way of varying the range of counter-balancing torques applied on shaft 18 is to attach a weight 28 to the end of wire 22 depending from pulley 23. Accordingly, by the selection of a proper mass of chain 24 with or without an added weight 28, a range of counter-balancing torques may be applied on shaft 18 corresponding to the anticipated range of torques transmitted to rotor 17 by a given stock passing through vessel 10.

For any given stock, all the variations in consistency may be adequately indicated by the rotation of rotor 17 through a 90° angle. For this purpose, a quarter-circular scale is fixed about the axis of shaft 18 and an indicator arm 30 cooperating with scale 29 is fastened to one side of pulley 21.

For the automatic regulation of the consistency of the stock flowing through vessel 10, additional means are provided in association with shaft 18 which in response to the angular movement of shaft 18 will automatically control the flow of diluting liquid into the feed stock entering vessel 10. Such automatic regulating means may comprise an electrical sensing device 31 for the angular movements of shaft 18 which by way of cable 32 will operate a motor-driven valve 33 disposed in water line 34 which discharges tangentially into inlet 11.

In order to provide a leakproof closure around shaft 18 which is substantially frictionless, it has been found desirable to seal a collar 35 on shaft 18. A thin-walled rubber or like impermeable and flexible tubing 36 is fitted over collar 35 and extends to a similar collar 37 on the bottom of top plate 19. Thus, tubing 36 with its opposite ends tightly fitted over collars 35 and 37 provides a liquid-tight closure around shaft 18. Since as already indicated shaft 18 will not turn more than about 90°, tubing 36 will exert very little resistance to such turning of shaft 18. If desired, the slight resistance or torque resulting from the twisting of tubing 36 with a 90° movement of shaft 18 may be measured and taken into account in calibrating the consistency regulator.

It has also been found very desirable to jiggle or reset the angular position of rotor 17 at frequent intervals of about one-half minute. Simple means for such resetting of rotor 17 comprise a collar 38 fastened on shaft 18 and provided with a radial arm 39. A disk 40 supported by a rotatable shaft 41 is so positioned that a radial arm 42 projecting from disk 40 will periodically engage arm 39 momentarily causing shaft 18 to be jiggled angularly.

To ensure thorough mixing of water admitted by way of valve 33 with the feed stock introduced through inlet 11, the lower portion of the blades of stirrer 13 have perforations or holes 43 which increase the liquid turbulence. For the same reason, a baffle 44 is disposed in vessel 10 along the upper portion of inlet 11 where it discharges into vessel 10. Vessel 10 is provided with a sealable aperture 45 which permits access to such structural elements as rotor 17 and tubing 36.

Figure 5:
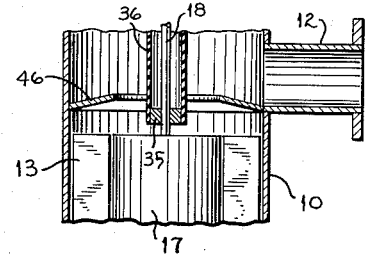
FIGURE 5 is a fragmentary sectional view of the consistency regulator of FIGURE 1 showing a modification thereof.

When working with paper stocks or other liquid-solid suspensions of relatively low consistency, it is advisable to operate the stirrer of the regulator at higher rotational speeds, say in excess of 100 revolutions per minute. In such cases, the stirrer may tend to create a vortex in the liquid flowing through the regulator, thus impairing the torque applied on the rotor by the whirling liquid. To avoid the formation of a vortex, FIGURE 5 shows an annular baffle 46 disposed in vessel 10 around shaft 18 just above the tops of stirrer 13 and reaction rotor 17.

While the ends of cylindrical rotor 17 are closed in the consistency regulator shown in FIGURE 1, this rotor, as shown in FIGURE 1A, may be an open-ended cylinder 17A attached to shaft 18 by spokes 18A so that the stock may flow interiorly as well as exteriorly of the rotor. Such an open-ended cylindrical rotor might be made of perforated sheet metal 17B or wire gauge 17C, as shown in FIGURES 1B and 1C, respectively. Similarly, the exterior surface as well as the interior surface, where liquid flows through the rotor, may have fins 17D or corrugations 17E extending parallel to the axis of the rotor, as shown in FIGURES 1D and 1E, respectively.

Figure 3:
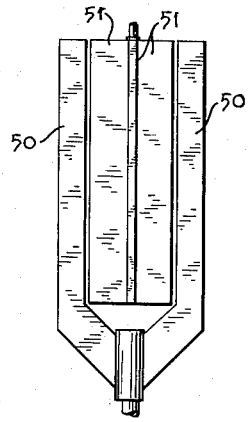
FIGURE 3 is an elevational view of an alternative stirrer and reaction rotor for the consistency regulator of this invention.
Figure 4:
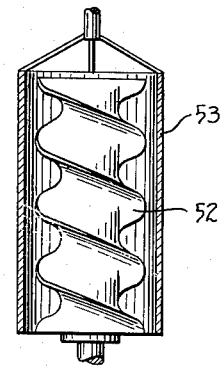
FIGURE 4 is also an elevational view of still another alternative stirrer and reaction rotor.

FIGURES 3 and 4 illustrate additional alternative stirrers and reaction rotors that may be employed in the consistency regulator of this invention. The stirrer in FIGURE 3 has only two blades 50 and the rotor consists of two blades 51 intersecting each other at right angles along the axis of the rotor. The stirrer of FIGURE 4 is a volute 52 made as a casting but may also be formed of a strip of sheet metal that has been twisted about the axis of rotation. The rotor is a hollow cylinder 53 disposed around volute 52. Thus, in FIGURE 4, the stirrer is surrounded by the reaction rotor which is the opposite relationship of stirrer 13 and rotor 17 of FIGURE 1.

Additionally, while cylindrical vessel 10 is shown in FIGURE 1 positioned with its axis vertically, it may be placed horizontally or otherwise. Inlet 11 and outlet 12 may reverse their positions so that the feed stock would enter vessel 10 adjacent shaft 18 and the regulated stock would leave adjacent shaft 14. The consistency regulator of FIGURE 1 might be completely inverted provided that pulley 23, chain 24 and rod 25 are repositioned so as to be operative with the inverted regulator. Still another variation would be to use rotor 51 of FIGURE 3 in an inverted position as the stirrer in vessel 10 of FIGURE 1 and to substitute stirrer 50 also in an inverted position for rotor 17.

Other means may be used in lieu of chain 24 to create a gradually increasing counter torque on shaft 18. For instance, a helical spring 24A may have one end attached to rod 25 and the other end tied to wire 22 as shown in FIGURE 6; obviously, the more the spring is stretched as rotor 17 is angularly displaced with increasing stock consistency, the greater is the counter torque applied on rotor 17 by the spring 24A. Likewise, FIGURE 7 shows that electrical sensing device 31 may be arranged to operate a valve 48 in a pneumatic tube 49 connected to a pneumatically controlled valve 33A instead of motor-driven valve 33; sensing device 31 may be pneumatic instead of electrical.

While the selected rotational speed of stirrer 13 will depend on the dimensions of the various structural elements in the consistency regulator and on the expected consistency range of the stock that will flow through the regulator, a speed in the range of about 50 to 100 revolutions per minute is usually suitable for the average paper stock. A constant-speed electric motor may drive stirrer 13 at the chosen speed either directly or through engaging gears and this may also be the case for shaft 41. However, a single motor may through a suitable gear arrangement drive both stirrer 13 and shaft 41 at different desired rotational speeds.

In a specific example of the consistency regulator of FIGURE 1, vessel 10 is 10 inches in diameter and inlet 11 and outlet 12 are 4 inches in diameter. Rotor 17 is 17 inches long and 5¾ inches in diameter. The blades of stirrer 13 are 1¼ inches wide. The vertical distance between the centerline of inlet 11 and that of outlet 12 is 25 inches. A paper stock containing approximately 3% by weight of suspended fiber may flow through this regulator at a rate of 27 tons of dry fiber per day. With stirrer 13 rotating 72 revolutions per minute, the stock may be maintained at 3% consistency with an accuracy of ±0.03%.

If inlet 11 and outlet 12 are enlarged to a diameter of 6 inches and vessel 10 is made 14 inches in diameter with corresponding increases in the dimensions of rotor 17 and the blades of stirrer 13, the regulator may be used to handle 60 tons of dry fiber per day in the form of stock of 3% consistency.

Upon consideration of the foregoing disclosure, various modifications of the invention will be apparent without departing from its spirit or scope. Thus, an uneven number of blades, e.g., three or five, may be used in stirrer 13. The blades may be adjustably fastened together or may have adjustable fins in order that the edge of each blade adjacent the surface of rotor 17 may have the desired clearance. In FIGURE 8, rotor 17F is frusto-conical instead of cylindrical as shown in FIGURE 1; in such case, the edges of the blades of stirrer 13F adjacent the rotor surface 17F would be not vertical but complementary to that frusto-conical surface. Then, the clearance between the edges of the stirrer blades and the rotor surface would be easily adjusted by moving either the rotor or the stirrer axially. Even vessel 10 may be tapered or frusto-conical. The term, tubular vessel, as used herein, embraces frusto-conical vessels with an apex angle not exceeding about 30°. Accordingly, only such limitations should be imposed on the invention as are set forth in the appended claims.

What is claimed is:

1. Apparatus for continuously indicating the consistency of a liquid-solid suspension flowing therethrough, which comprises a fixed tubular vessel, an inlet to and an outlet from said vessel for said suspension disposed in spaced relation to one another along the length of said vessel for flow of said suspension lengthwise of said vessel, a motor-driven stirrer and a reaction rotor mounted in said vessel on separate aligned shafts, said stirrer and said rotor being arranged in concentric spaced relation to one another, means associated with the shaft of said rotor for applying a gradually increasing torque to said shaft in response to a gradually increasing angular displacement of said shaft, said torque being counter to said angular displacement, and means for indicating variations in said angular displacement.

2. The apparatus of claim 1 wherein the reaction rotor has a cylindrical surface and the motor-driven stirrer has furcated blades extending parallel to the axis of said cylindrical surface.

3. The apparatus of claim 1 wherein the shaft of the reaction rotor is provided with a leak-proof seal where said shaft passes through a wall of the vessel comprising a length of flexible leak-proof tubing fitting loosely over said shaft and having one end sealed to said shaft and the other end sealed to said wall.

4. The apparatus of claim 1 wherein the shaft of the reaction rotor is provided with means for periodically effecting momentary angular displacements of said shaft.

5. The apparatus of claim 3 wherein the reaction rotor has a cylindrical surface and the motor-driven stirrer has furcated blades extending parallel to the axis of said cylindrical surface.

6. The apparatus of claim 3 wherein the shaft of the reaction rotor is provided with means for periodically effecting momentary angular displacements of said shaft.

7. Apparatus for continuously sensing the consistency of a liquid-solid suspension flowing therethrough, which comprises a fixed cylindrical vessel, an inlet to and an outlet from said vessel for said suspension disposed adjacent opposite ends of said vessel for flow of said suspension lengthwise of said vessel, a motor-driven shaft and a freely rotatable shaft extending along the axis of said vessel and into said vessel through said opposite ends, a stirrer and a reaction rotor in said vessel mounted, respectively, on said motor-driven shaft and said rotatable shaft, said stirrer and said rotor being arranged in concentric spaced relation to one another, means associated with said rotatable shaft for applying a gradually increasing torque to said rotatable shaft in response to a gradually increasing angular displacement of said rotatable shaft, said torque being counter to said angular displacement, and means for sensing variations in said angular displacement.

8. The apparatus of claim 7 wherein the reaction rotor has a cylindrical surface and the stirrer has a plurality of blades equally spaced from one another about said cylindrical surface and extending parallel to the axis of said cylindrical surface.

9. The apparatus of claim 8 wherein the freely rotatable shaft is provided with a leak-proof seal where said rotatable shaft passes through an end wall of the cylindrical vessel comprising a length of flexible leak-proof tubing fitting loosely over said rotatable shaft and having one end sealed to said rotatable shaft and the other end sealed to said end wall.

10. The apparatus of claim 9 wherein the freely rotatable shaft is provided with means for periodically effecting momentary angular displacements of said rotatable shaft.

11. The apparatus of claim 7 wherein the means for sensing variations in angular displacement provides magnified visual indications of said variations.

12. The apparatus of claim 7 wherein the freely rotatable shaft extends through the upper end of the vessel and is provided with a leak-proof seal comprising a length of flexible leak-proof tubing fitting loosely over said rotatable shaft and having one end sealed to said rotatable shaft and the other end sealed to said upper end of said vessel.

13. The apparatus of claim 12 wherein the freely rotatable shaft is provided with means for periodically effecting momentary angular displacements of said rotatable shaft, and the means for sensing variations in angular displacement provides magnified visual indications of said variations.

References Cited in the file of this patent

UNITED STATES PATENTS

| | | |
|---|---|---|
| 1,836,995 | Stickney | Dec. 15, 1931 |
| 1,930,629 | Stevens | Oct. 17, 1933 |
| 1,985,313 | Bryson | Dec. 25, 1934 |
| 2,017,225 | Whitham | Oct. 15, 1935 |
| 2,096,222 | Bock | Oct. 19, 1937 |
| 2,099,443 | Kraft | Nov. 16, 1937 |
| 2,192,039 | Harcourt | Feb. 27, 1940 |
| 2,382,979 | Demb | Aug. 21, 1945 |
| 2,773,507 | Norris | Dec. 11, 1956 |

FOREIGN PATENTS

| | | |
|---|---|---|
| 253,079 | Switzerland | Nov. 1, 1948 |